United States Patent [19]

Johnson

[11] 3,767,140
[45] Oct. 23, 1973

[54] AIRPLANE FLAPS

[75] Inventor: Robert E. Johnson, Los Alamitos, Calif.

[73] Assignee: McDonnel Douglas Corporation, Santa Monica, Calif.

[22] Filed: Nov. 3, 1971

[21] Appl. No.: 195,283

[52] U.S. Cl............................ 244/42 DA, 244/42 D
[51] Int. Cl. ................................................ B64c 3/50
[58] Field of Search ..................... 244/42 D, 42 DA, 244/42 DB, 42 DC, 42 R, 43

[56] References Cited
UNITED STATES PATENTS

| 2,361,275 | 10/1944 | Davie ........................... 244/42 D X |
| 2,589,026 | 3/1952 | Phillips .......................... 244/42 DB |
| 2,772,058 | 11/1956 | Grant ............................ 244/42 DB |
| 3,013,748 | 12/1961 | Westburg ...................... 244/42 DB |
| 3,447,761 | 6/1969 | Whitener et al. ............... 244/42 DA |
| 3,614,028 | 10/1971 | Kleckner ....................... 244/42 DA |

*Primary Examiner*—Milton Buchler
*Assistant Examiner*—Barry L. Kelmachter
*Attorney*—Walter J. Jason et al.

[57] ABSTRACT

A flap and linkage system for a STOL (short takeoff and landing) aircraft having swept tapered wings. The flap linkage fairings are streamlined and the flaps move basically aft in the airstream direction and rotate in a hinge system which is approximately parallel to the rear wing spar. The length of movement of the flap is proportional to the length of the wing chord at the point of measurement, approximating a conic motion of the flap support points. Hydraulic actuation of the flap linkage also initiates spoiler movement.

2 Claims, 7 Drawing Figures

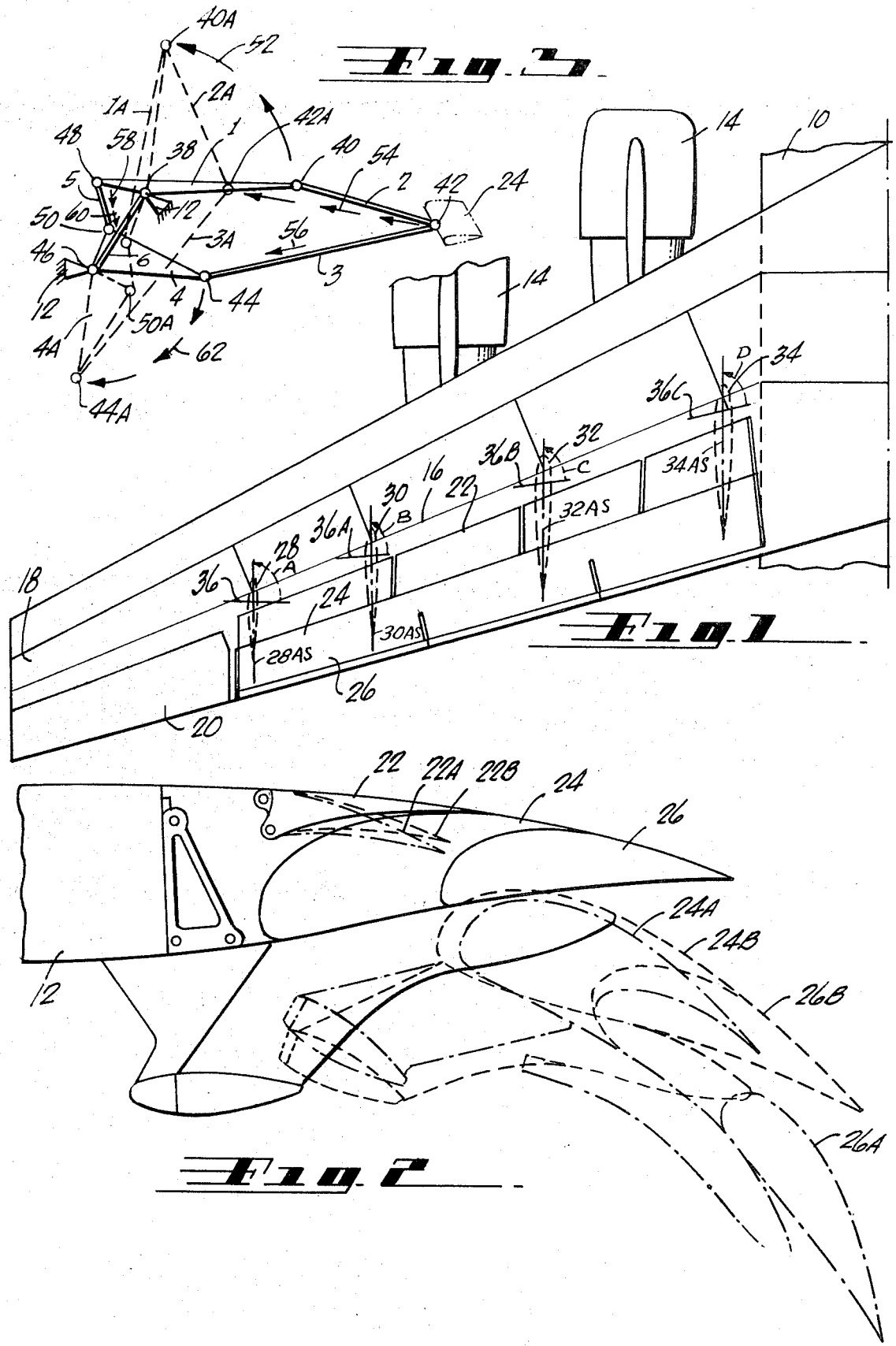

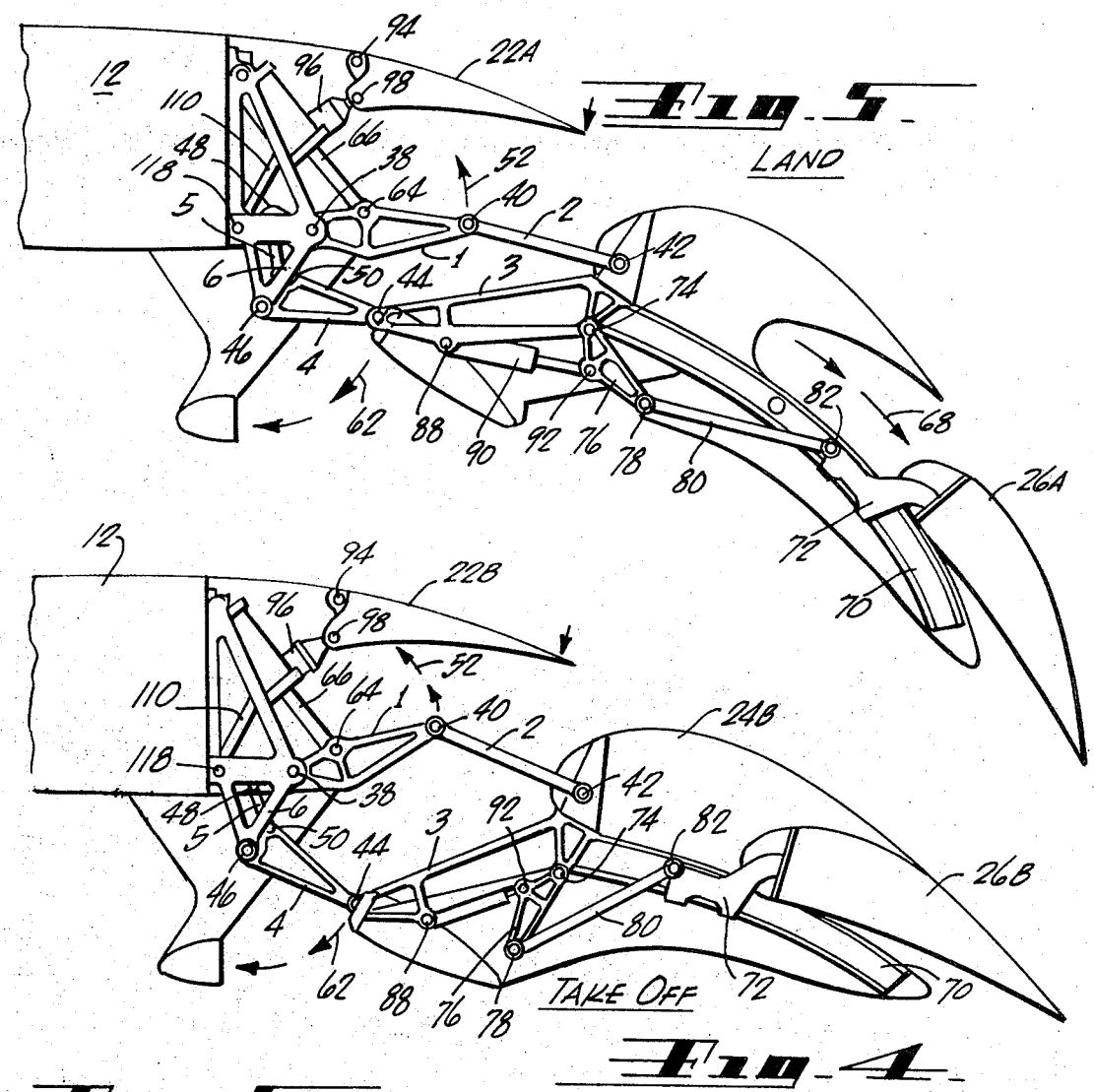
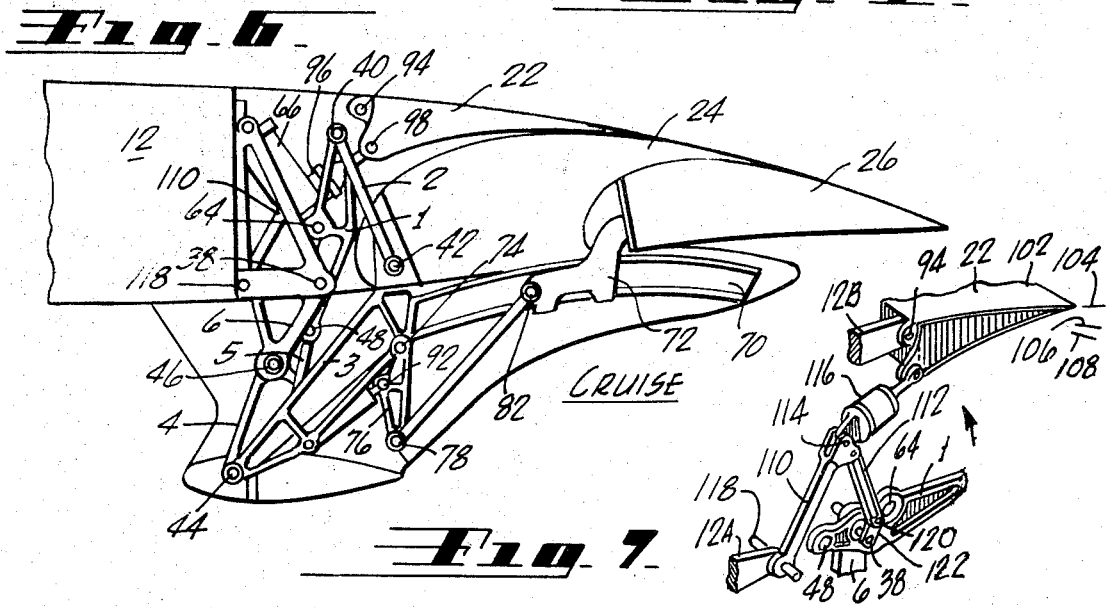

AIRPLANE FLAPS

BACKGROUND OF THE PRESENT INVENTION

The present invention provides for a flap and linkage system for the placement of flaps for optimum aerodynamic advantage for a STOL aircraft having swept tapered wings. Swept tapered wings in the past have had flaps that work in a system approximately normal to the wing rear spar. The flaps thus did not move directly back, but at an angle to the fuselage of the airplane. The links were confined to the depth or thickness of the interior wing structure since linkage fairings required otherwise would not be streamlined in the direction of the airflow, or would be very bulky. For STOL aircraft, moreover, and other aircraft requiring highly efficient high lift systems, longer links are needed for the larger flaps and for their longer extension. This requires the linkage to extend below the wing and requires the linkage fairings to be as streamlined as possible. This, in turn, requires the linkage to move the flap rearwardly in alignment with the airstream direction instead of normal to the rear spar of the wing. Also, on a high wing STOL aircraft it is desirable that the inboard end of the flap be close to the fuselage at all times and accordingly, move rearwardly in the airstream direction. The use of hydraulic actuated linkage is preferable to that of tracks when possible in order to save weight and to eliminate the use of jack screws and their service problems.

SUMMARY OF THE PRESENT INVENTION

In accordance with the present invention a flap and linkage system has been provided for a STOL aircraft having swept tapered wings. The flaps move basically aft in the airstream direction and rotate in a hinge system which is approximately parallel to the rear wing spar. The length of movement of the flap is proportional to the length of the wing chord at the point of measurement, approximating a conic motion of the flap support points. The flap linkage is shrouded by streamlined fairings. Except for wing bending expansion joints in the trailing edge of the aft flap section, the fore and aft flaps are full and continuous for the length of the flaps. A six-bar linkage is used with coordinated actuation of the spoiler, with the forward flap. The rear flap is independently actuated. The spoiler also may be actuated normally and independently by its own actuation system if preferred.

BRIEF DESCRIPTION OF THE DRAWINGS

FIG. 1 is a plan view of a portion of an aircraft wing showing the rearward movement of the flaps;

FIG. 2 is a side elevational schematic view showing the various flap positions desired for the various operational modes;

FIG. 3 is a graphic illustration of the six-bar linkage for retraction of the forward flaps;

FIG. 4 is an elevational, sectional view showing the position of the linkage of the flaps in the takeoff mode;

FIG. 5 is a similar view showing the linkage of the flaps in the landing mode;

FIG. 6 is a similar view of the linkage of the flaps in the normal cruise mode; and FIG. 7 is a perspective view showing linkage for spoiler actuation.

DETAILED DESCRIPTION OF THE ILLUSTRATIVE EMBODIMENT

Reference is now made to FIG. 1 wherein there is shown an aircraft fuselage 10 having a top swept tapered wing 12 with a pair of engines 14 mounted on each side of the fuselage. The wing and engine relationship preferably is that shown more fully and set forth in the patent to Kleckner, U.S. Pat. No. 3,614,028, issuing Oct. 19, 1971, the subject matter of which is incorporated herein as though fully set forth. Wing 12 has a chord line 16 which represents the mid-point between the leading edge and the trailing edge of the wing which extends at an angle other than 90° to the fuselage 10. Hence, the wing is a swept wing. Both the thickness and width of the wing is smaller as the wing extends out to the wing tip 18 and thus the wing is a tapered wing. Ailerons 20 are along the outer trailing edge of the wing for roll control in the conventional manner. Inboard from the ailerons 20 is mounted a flap and flap-actuation system including spoilers 22, forward flap 24 and aft flap 26. The flaps are actuated by linkage in fairings 28, 30, 32 and 34 in four stations. These fairings are streamlined and are aligned parallel with the airstream when the airplane is in flight. As will be more fully explained hereinafter, there is a linkage axis 36 at station 28, which is a fixed pivot axis normal to the airstream. This axis at stations 30, 32 and 34 is progressively rotated slightly counterclockwise on the left wing and, of course, clockwise on the right wing. Thus angle B is smaller than angle A, angle C is smaller than angle B, and angle D is smaller than angle C. The purpose of this is to permit an approximate conic motion of the flap support points and maintain true distance between these points of support during extension. This conic motion results in a point on forward flap 24 at fairing station 28 passing through the same arc as a point at fairing station 34 although along a smaller radius. This conic motion on a swept wing together with the axis rotation between fairings prevents the flap from gouging the fuselage during extension.

As a second example of axis rotation between fairing stations, suppose axis 36B at staiton 32 was made normal to the airstream. In this case axis 36C rotates counterclockwise and angle D is smaller than angle C. However, axes 36A and 36 rotate clockwise and angles A and B are larger than angle C.

Reference is now made to the illustration in FIG. 2 wherein there is shown a rearward portion of the wing 12 with the spoiler 22 and flaps 24, 26 in takeoff cruise and landing positions. Spoiler 22, forward flap 24 and aft flap 26 are shown in their cruise position in solid line, their landing positions 22A, 24A and 26A with broken lines, and in dashed lines in their takeoff positions 22B, 24B and 26B, respectively. These positions have been dictated by aerodynamics criteria for a STOL aircraft having such a wing as described in connection with FIG. 1. The present invention resides in the flaps and linkage system for performing these functions.

Reference is now made to the graphic illustration in FIG. 3 which shows a six-bar linkage for the operation of the forward flap 24. The six links are pivotally connected at pivot points 38, 40, 42, 44, 46, 48 and 50, as shown. Link 1 is pivotally connected at pivot 38 to a fixed portion of the wing 12. Link 2 is pivotally connected to link 1 at pivot 40. The other end of link 2 connects with link 3 through pivot 42. Pivot 44 connects link 3 with link 4, whose other end is pivotally connected at 46 to a rigid portion of the wing 12. Link 5 is pivotally connected at pivot 48 to link 1 and at a mid-point 50 in link 4. Link 6 is non-movable and represents a connection between fixed points 38, 46 on the wing 12. Pivot 42 represents a point in the forward flap 24 which, in this diagram, is shown as an extension of lever 3. In this diagram, the forward flap 24 is in its rearward extended position.

In retracting the flap 24 to its forward cruise position, a moving means, not shown, must rotate link 1 in a counterclockwise position about pivot point 38, as shown by arrow 52. When this occurs, link 2 moves to the left in the direction of arrow 54 and in a similar manner link 3 moves in the direction of arrow 56. As the right-hand portion of lever 1 moves upwardly, the left portion moves downwardly about pivot 38, as shown by arrow 58. This, in turn, moves link 5 downwardly, as shown by arrow 60, and depresses link 4 in the direction of arrow 62. The linkage then assumes the position shown in dotted lines with the new pivot point locations identified by corresponding pivot point numbers followed by the letter A. The forward flap 24 is then included as part of the wing in its cruising position.

Reference is now made to the illustration in FIGS. 4, 5 and 6 which is takeoff, landing and cruise positions, respectively, of the spoilers 22, forward flaps 24, and aft flaps 26. In FIG. 4 the spoilers and flaps have identifying numerals followed by the letter B since they are in the takeoff positions shown in FIG. 2. In FIG. 5 the spoiler and flaps have identifying numerals followed by the letter A to designate their position in the landing mode as shown in FIG. 2. The spoiler and flaps in FIG. 6 are in the cruise mode as shown in FIG. 2 and their identifying numerals are not followed by a letter. The position of the six-bar linkage in these modes are shown in these views with the links or levers numbered 1 to 6, respectively. Between the pivot points 38 and 40 of lever 1 is a pivotal connection 64 to which is attached a hydraulic actuator 66. This actuator lowers flap 24 to the position shown in FIG. 4 for takeoff, lowers it slightly more for the landing position in FIG. 5 and raises it to the cruise position shown in FIG. 6. The six-bar linkage operates as shown and as previously discussed.

As can be seen in FIG. 4, there is no relative movement between the aft flap 26B and the fore flap 24B although as shown in the landing mode in FIG. 5 there is additional movement of the aft flap 26A, as shown by the arrow 68. For this purpose there is a trackway 70 connected to, and is an extension of, link 3. Aft flap 26 is mounted on this trackway by means of a guide 72. Pivotally connected near the front of flap 24 at pivot 74 is a link 76, the other end 78 of which is pivotally connected to a connecting link 80. This connecting link 80 is pivotally connected at 82 to the guide 72 to which aft flap 26 is affixed. Pivotally mounted at pivot 88 on link 3 is another hydraulic actuator 90 which is pivotally connected at 92 to link 76. This actuator 90 is foreshortened as shown in FIG. 4 to keep aft flap 26 in its forward position as part of fore flap 24. The extension of actuator 90 causes rearward movement of link 76 about pivot 74. This, in turn, extends flap 26 in the direction of the arrows 68 in FIG. 5. Conversely, the foreshortening of actuator 90 will withdraw the aft flap back to its original position. It should be noted that this actuation of separating the two flaps for landing or the maintaining of the two flaps together for takeoff is done independently of any actuation of the fore flap 24 which requires manipulation of the six-bar linkage by the actuator 66.

The spoiler 22 has three positions as shown in FIG. 2 for the various operational modes of the aircraft. As previously stated with reference to FIG. 2 the position designated as 22 is its normal cruise position. The lowermost position designated 22A is its landing position and its position shown by 22B is its takeoff position. In addition, the spoiler 22 can also be tilted upwardly to serve as an air brake in a different maneuver.

The three positions of spoiler 22 are shown in FIGS. 4, 5 and 6 and its actuating structure is shown in perspective in FIG. 7. Here the spoiler 22 is shown connected to a portion 12B of the wing 12 through pivot 94. An actuator 96 is pivotally connected at 98 to the spoiler 22. A linkage structure is provided so that when link 1 rotates clockwise about pivot 38, as shown by arrow 100, the trailing tip 102 of the spoiler 22 moves from its cruise position, indicated by a line 104, downwardly to a position indicated by line 106, which is its takeoff position.

In the landing mode the actuator 96 is further elongated to move the trailing edge 102 down to the position indicated by line 108. Otherwise, the structure shown in FIG. 7 is for the purpose of moving the trailing edge 102 between positions 104 and 106. This is done through the pivoting link 110 and a crank-actuated link 112 connected to actuator 96 at pivot points 114 and 116. The other end of link 110 is pivotally connected at 118 to a bracket 12A which is part of the wing 12. The other end of link 112 is pivotally connected at 120 to a crank 122 which extends from a point of rotation 38 and is adapted to rotate about pivot point 38 with the rotation of link 1. Thus, the clockwise movement of pivot 40 on link 1 in the direction of arrow 100 causes the rear edge 102 to move downwardly to position 106 and, conversely, the counterclockwise motion of link 1 in the direction of arrow 124 will return edge 102 of spoiler 22 back to its cruise position indicated by line 104. Although most of this structure in FIG. 7 is hidden from view in FIGS. 4, 5 and 6, certain portions of the linkage and identifying numerals are shown in order to indicate the relationship of the spoiler and its actuation with the flap actuating structure shown in those views.

Having thus described an illustrative embodiment of the present invention, it is to be understood that modification thereof will become apparent to those skilled in the art and it is to be understood that these deviations are to be construed as part of the present invention.

I claim:

1. An aircraft flap and linkage system for an aircraft having a swept tapered wing wherein the aircraft craft is of a STOL (Short Takeoff and Landing) type, said system comprising:
   a spoiler, forward flap and aft flap positioned along the rearward edge of said wing and adapted to form a part thereof in the aircraft cruising mode,
   means pivoting said spoiler downwardly,
   means moving both said flaps rearwardly in spaced relationship to said rearward edge of said wing for the aircraft takeoff mode, and means moving said aft flap rearwardly and downwardly in spaced relationship to said forward flap for the aircraft landing mode, both said moving means comprising a linkage system extending along selected fairing stations along said wing and protruding into the airstream below the wing during said aircraft cruising mode, and a pivotal linkage connection to said wing at each station oriented in such manner that said forward flap pivots with an approximate conic motion, said conic motion being greater nearer the fuselage of the aircraft and lesser nearer the wing tip, one of said pivotal linkage connections having a pivot axis normal to the airstream and other of said pivotal linkage connections at other of said stations having pivot axes that are angularly oriented relative thereto, wherein said linkages pivot and move in the direction of the airstream to permit housing within streamlined fairings below said wing.

2. An aircraft flap and linkage system as in claim 1 wherein movement of said forward flap causes downward movement of said spoiler.

* * * * *